(12) United States Patent
Ladouceur et al.

(10) Patent No.: US 6,226,854 B1
(45) Date of Patent: May 8, 2001

(54) FASTENER DIE MEMBER

(75) Inventors: Harold A. Ladouceur, Livonia; Harold T. Woods, Canton, both of MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

(21) Appl. No.: 09/302,215

(22) Filed: Apr. 29, 1999

Related U.S. Application Data

(60) Provisional application No. 60/083,578, filed on Apr. 30, 1998.

(51) Int. Cl.$^7$ .............................. B21D 39/00; B23P 11/00
(52) U.S. Cl. ............................................. 29/505; 29/243.5
(58) Field of Search ........................... 29/432.2, 505, 29/798, 243.5

(56) References Cited

U.S. PATENT DOCUMENTS

| | | | |
|---|---|---|---|
| 4,484,385 | * | 11/1984 | Woods ............................. 29/432.2 |
| 5,208,963 | * | 5/1993 | Ladouceur ........................ 29/798 |
| 5,239,740 | * | 8/1993 | Ladouceur ...................... 29/432.2 |
| 5,502,888 | * | 4/1996 | Takahashi et al. ................ 29/432.2 |

* cited by examiner

*Primary Examiner*—S. Thomas Hughes
*Assistant Examiner*—Jermie E. Cozart
(74) *Attorney, Agent, or Firm*—Howard & Howard

(57) ABSTRACT

The present invention relates to an improved die member, panel and fastener assembly and method for installing a fastener into a panel. The die member has a pair of opposed clinching lips protruding from an end face. The opposed clinching lips have a contact face that narrows as it approaches the opposed ends of the contact face and sidewalls that are angled with respect to vertical. The lips, due to the dual angles, substantially and simultaneously drive panel metal into fastener grooves both longitudinally and laterally. The fastener and panel assembly have panel metal deformed into the fastener grooves resulting in generally wedge-shaped portions of panel metal in the opposed ends of the fastener grooves.

7 Claims, 5 Drawing Sheets

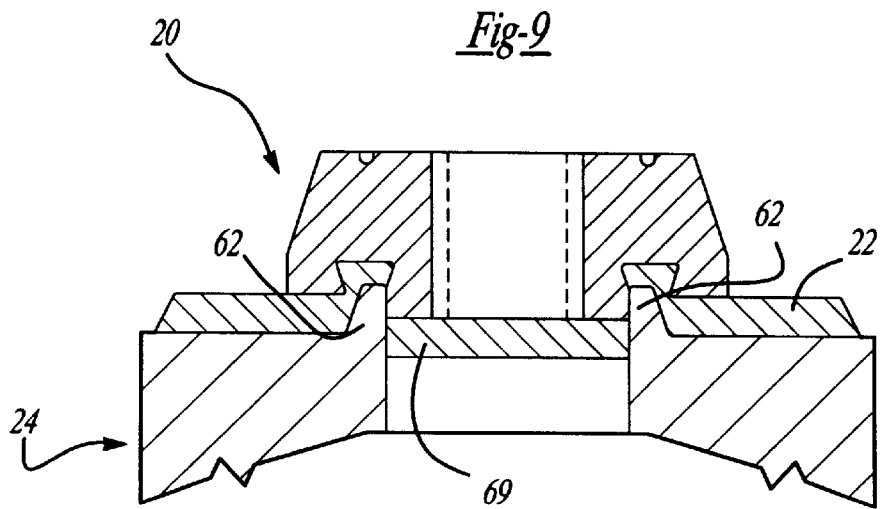
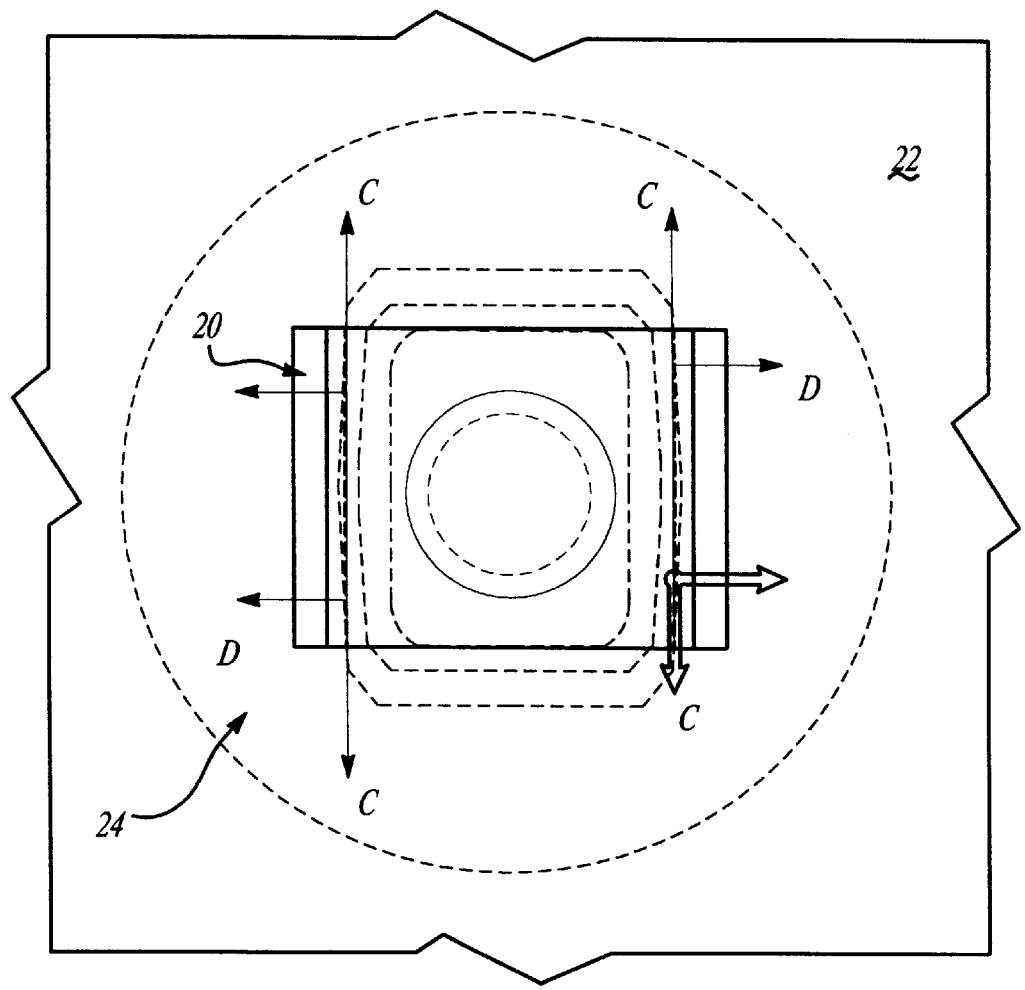

FASTENER DIE MEMBER

This application claims the benefit of U.S. Provisional Application No. 60/083,578, filed on Apr. 30, 1998.

BACKGROUND OF THE INVENTION

The present invention relates to die members, panels and fastener assemblies and methods for the installation of fasteners into a workpiece such as for example panel metal. More particularly, the present invention relates to an improved die member and method of installation that provides a better fastener installation and has a much longer life than previous die members. The main objective of the die member of the present invention is to reduce the stress on and breakage of the die member that was experienced by conventional die members, and to push more metal into the groove of the fastener to provide a more secure attachment.

The die member of the present invention is used in a fastener installation process shown generally in for example U.S. Pat. No. 4,630,363. The die member typically sits below the panel into which a fastener is to be installed and is mounted in the bottom platen of a press. An installation head which holds the fastener to be installed is mounted to the upper press platen and positioned on the other side of the panel. When the press closes, the installation head drives the fastener into the panel and the die member causes the panel to be deformed into the locking grooves and around the ends of the fastener.

One difficulty with standard die members is that the die members can break during the installation process. This results in a bad installation in the panel and the need to stop the press to replace the die member. As will be appreciated by those of ordinary skill in the art, when a press is shut down the cost in lost production time can be considerable. Therefore, a die member that has increased life will result in less downtime and increased production capabilities for each press.

SUMMARY OF THE INVENTION

The present invention overcomes the above difficulties experienced in standard die buttons and fastener and panel assemblies. The die button of the present invention has an end face with a pair of opposed clinching lips which protrude from the end face. The clinching lips are generally parallel to one another and have a generally flat end face for engaging a panel to which a fastener is to be installed. The clinching lips include a base which is integral to the end face of the die member and an outer sidewall which joins the end surface and the base. The end surface has a mid-point and opposed ends with the end surface being wider at the mid-point than at the ends and the base is wider than the end surface. The die button is used to attach a fastener having opposed, parallel grooves to a panel metal. The grooves have a base and sidewalls. The die member generally mates with these grooves and drives panel material into these grooves to fill the grooves. The configuration of the clinching lips of the die member is such that the panel metal is plowed from adjacent the mid-point to the sides of the groove and to the ends of the groove to completely fill the groove and still maintain the die button integrity.

In one embodiment, the die button end surface narrows gradually from about the mid-point to the opposed ends. In another embodiment the end surface begins to narrow gradually a spaced difference on either side of the mid-point.

The invention further teaches a novel panel and fastener assembly which comprises a fastener having generally parallel channel-shaped grooves with each groove having a bottom wall, opposed sidewalls, a mid-point portion and opposed open end portions. The panel is plastically deformed into these grooves to define a mating region of the panel. The mating region is forced against the bottom wall and opposed side walls of the grooves. The mating region defines a panel bottom surface adjacent the bottom wall, a first side surface adjacent one of the opposed sidewalls and a second side surface adjacent one of the other opposed sidewalls. The first side surface has a greater width at the opposed open end portions than at the mid portion.

In one embodiment, the first side surface width of the panel metal increases from about the mid-point to the opposed open end portion. In a second embodiment, the first side surface of the panel metal has a generally uniform width along a middle portion of the first side surface adjacent the mid portion and opposed outer portions which are generally wedge-shaped.

The present invention also discloses a method of attaching a fastener to a deformable metal panel by locating the panel on a die member having spaced generally parallel projecting lips adapted to be received in the fastener grooves of the fastener. A fastener is located opposite the panel with the fastener grooves aligned with the die member lips. The fastener and panel are driven together driving the die member lips into the fastener grooves shearing a slug and deforming portions of the panel into the fastener grooves. The die member lips substantially simultaneously drive the panel portions in the fastener grooves longitudinally toward the open end portions of the grooves and laterally toward the sidewalls of the grooves.

Other advantages of the present invention will be readily appreciated as the same becomes better understood by reference of the following detailed description when considered in connection with the accompanying drawings.

BRIEF DESCRIPTION OF THE DRAWINGS

FIG. 9 is a cut-away view of the die button of FIG. 2, panel and fastener of the present invention; and, FIG. 10 is a top view of FIG. 9.

DETAILED DESCRIPTION OF THE INVENTION

Figure 1:
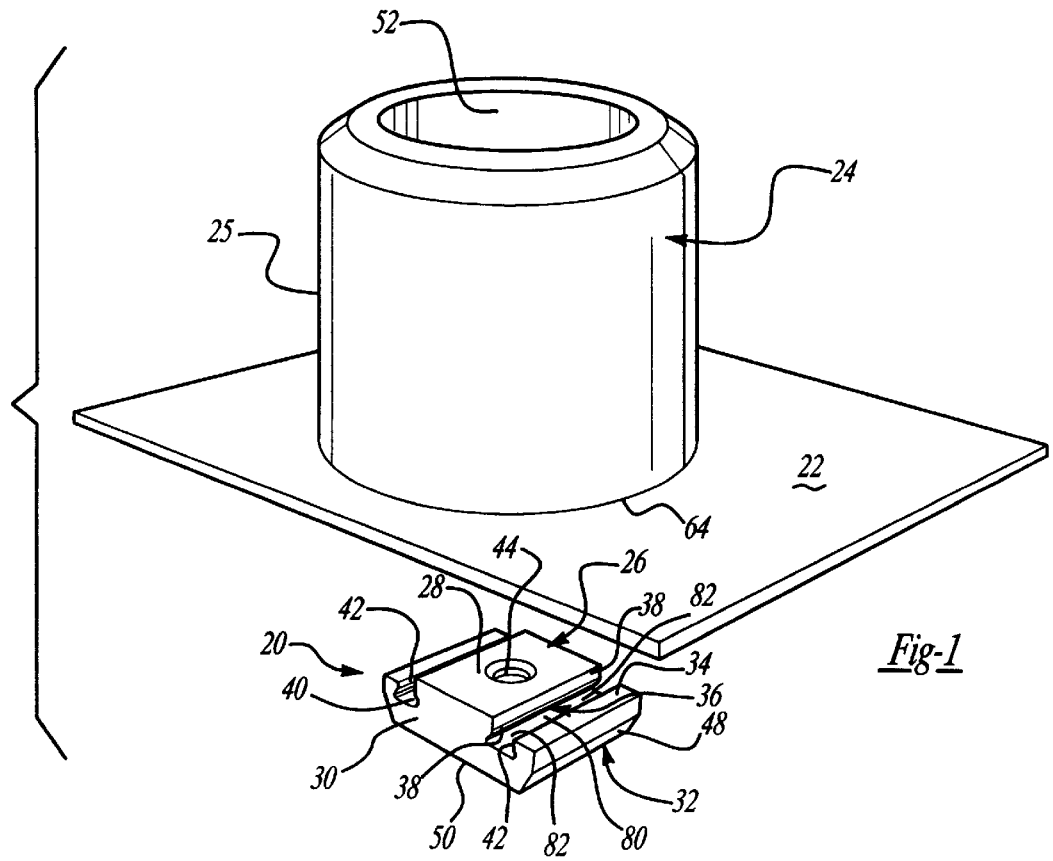
FIG. 1 is a perspective view of the die button, panel and fastener of the present invention.

FIG. 1 shows a pierce nut 20 of the type used with the die member 24 of this invention, ready for installation in a panel 22 by die member 24. The illustrated pierce nut includes a central rectangular pilot portion 26 having a flat top piercing face 28, end walls 30 generally perpendicular to the top face 28 of the pilot and integral flange portion 32 on opposed sides of the pilot. The flange portions 32 include top panel bearing faces 34 spaced below the plane of the top face 28 of the pilot, and parallel grooves 36 on opposed sides of the pilot 26 extending perpendicular to the end walls 30 of the nut.

It will be understood that "top" and "bottom" are relative terms and are used herein for purposes of description only. Further, the pierce nut, panel and die member are arranged in the drawings to illustrate the method of forming the nut and panel assembly of this invention. In actual use, the die member 24 will generally be the lower or bottom element and the pierce nut is moved downwardly by the pierce nut installation head to form the nut and panel assembly. As will be appreciated by those of ordinary skill in this art, a pierce nut is generally installed by a pierce nut installation head in a die press assembly. The panel may be simultaneously formed in the die press, particularly in automotive applications, and several pierce nuts may be simultaneously installed in the panel, in one stroke of the press. FIG. 1, however, illustrates a commercial application, regardless of whether the pierce nut 20 is located above or below the die member 24, with the panel 22 located therebetween.

The parallel grooves 36 each include an inner side wall 38, a bottom wall 40 and an outer side wall 42. In the disclosed embodiment of the pierce nut 20, the grooves are re-entrant, wherein one or both of the inner and outer side walls, 38 and 42, respectively, are inclined inwardly, toward the longitudinal axis of the groove, to form a restricted groove opening. The re-entrant grooves entrap the panel metal deformed into the grooves substantially improving nut retention, as described in U.S. Pat. No. 3,648,747, which is included herein by reference.

The disclosed pierce nut 20 includes a central threaded bore 44 having an axis generally perpendicular to the top face 28 of the pilot 26. In the disclosed embodiment of the pierce nut, the pilot also includes side walls 38 perpendicular to the top face 28 of the pilot, and the sides 48 of the flanges are truncated primarily to reduce the weight or mass of the pierce nut. The bottom face 50 of the pierce nut is preferably flat and generally parallel to the top face 28 of the pilot. The bottom face 50 is engaged by a plunger of an installation apparatus or head (not shown) to form the nut and panel assembly; see also U.S. Pat. Nos. 3,108,368 and 3,969,808, which disclose suitable installation heads which may be utilized to form the nut and panel assembly of this invention. Both of the above-referenced patents are assigned to the assignee of the present application and the disclosures are incorporated herein by reference.

Figure 2:
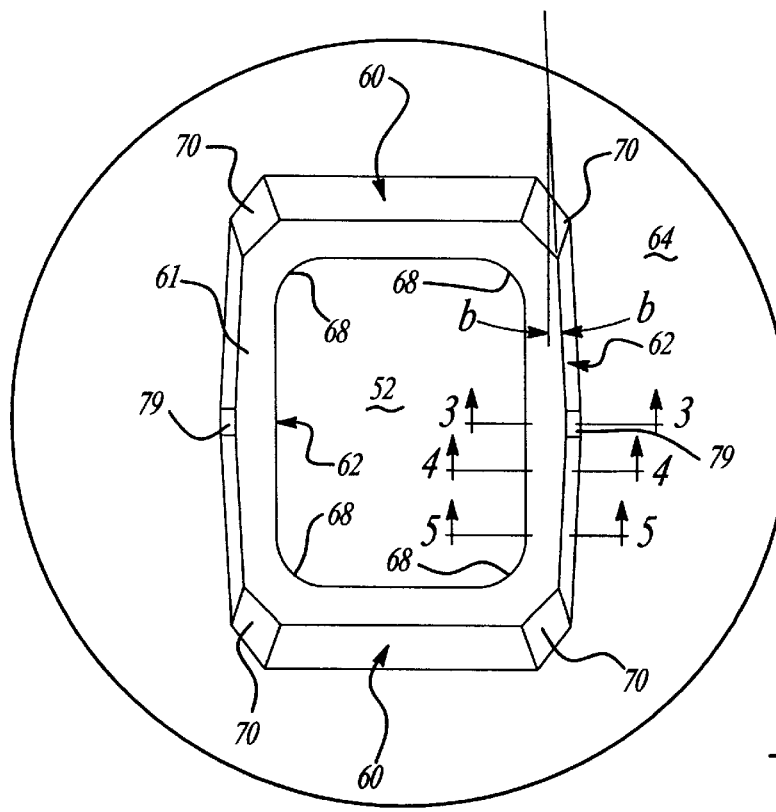
FIG. 2 is a top view of the die button of FIG. 1.

The die member of the present invention is shown generally at 24 in FIG. 1 and the face of the die member 24 is shown in FIG. 2. The die member 24 has a body 25 and an end face 64. The end face is shown in FIG. 2. An opening 52 is formed for receipt of the slug formed by the pierce nut 20 cutting through the panel 22. The face 64 has lips 60 and 62 which drive panel metal into the grooves 36 of the fastener 26 and along end faces 30. The lips 60 are staking lips which keep the fastener from moving with respect to panel 22 when the fastener 20 is installed. The staking lips 60 are generally parallel to one another. The lips 62 are clinching lips which clinch the panel metal into the grooves of the fastener 20. The end surface 61 of lips 60 and 62 is generally flat.

Figure 3:
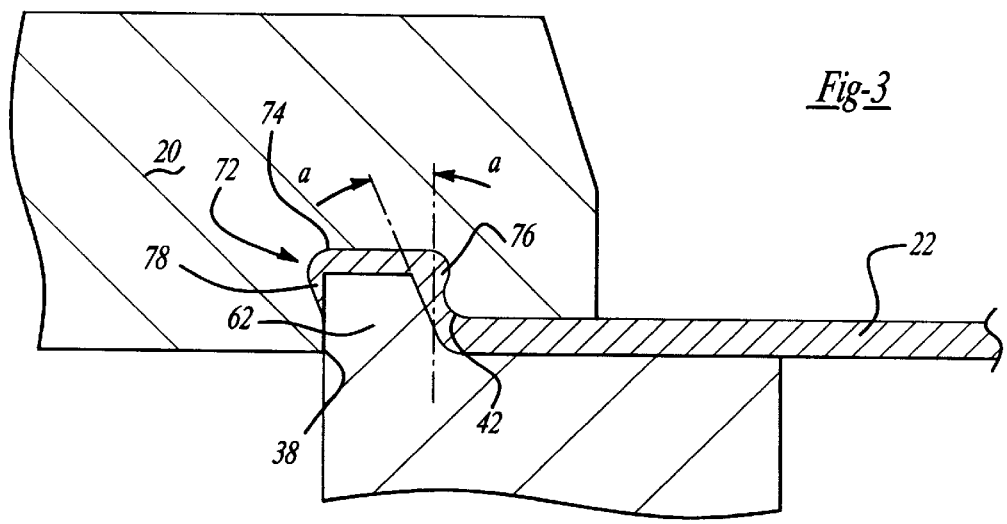
FIG. 3 is a cut-away view taken along lines 3—3 of FIG. 2.
Figure 4:
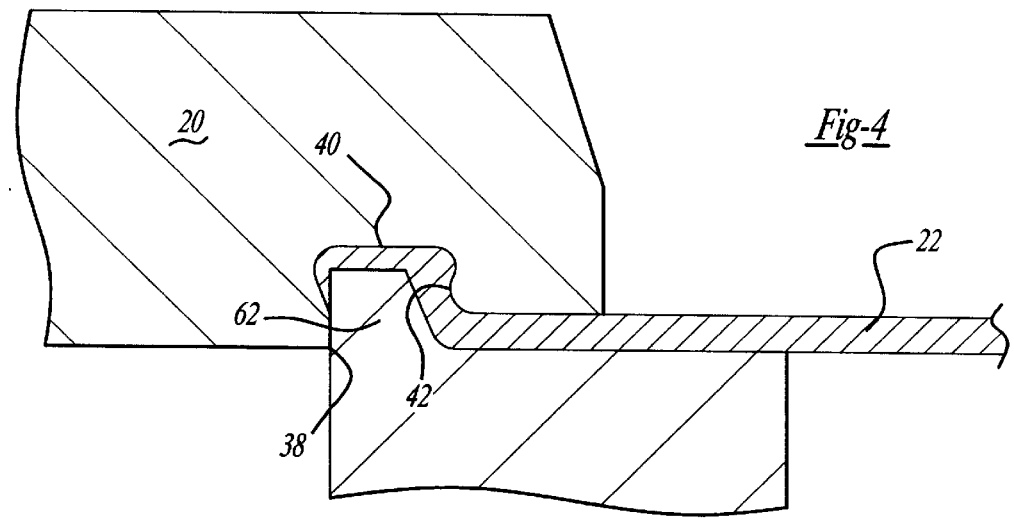
FIG. 4 is a cut-away view taken along lines 4—4 of FIG. 2.
Figure 5:
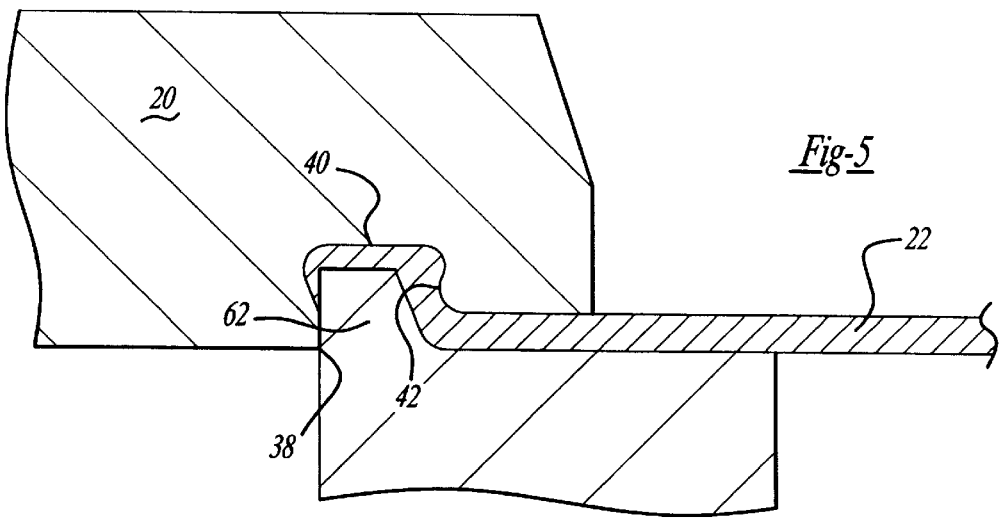
FIG. 5 is a cut-away view taken along lines 5—5 of FIG. 2.

The lips 62 are angled with respect to the vertical and horizontal axes. As illustrated in FIGS. 3 through 5, the sides of the lips 62 are angled with respect to the die vertical axis between 10° and 20° and preferably at about 15°, see arrows a—a, in FIG. 3. As illustrated in FIG. 2, the sides of the lips 62 are also angled with respect to the horizontal axis between 1° and 10° and preferably at about 5°, see arrows b—b in FIG. 2. The angle of the lips 62 in two planes facilitates enhanced packing of metal into the groove of the fastener 20, which will be discussed in greater detail below.

The lips 60 are angled with respect to the contact face 61 between 40° and 50° and preferably at about 45°. The inner corners 68 of the die member lips are radiused and the outer corners 70 of the lips are angled at approximately the same angle to the vertical as lips 60. The contact face 61 of the lips 60 and 62 is generally flat to provide a greater surface area to force panel metal into the grooves 36 and provide a larger surface area to reduce the contact pressure acting on the lips 60, 62.

The packing of the metal into the grooves 36 is illustrated in FIGS. 3 through 5 and FIG. 10. The illustration in FIG. 3 is a section taken along lines 3—3 of FIG. 2; FIG. 4 is a section taken along lines 4—4 of FIG. 2 and FIG. 5 is a section taken along lines 5—5 of FIG. 2. As illustrated in FIG. 3, the lip is wider than the lip in FIGS. 4 and 5. The lip 62 is widest at the midpoint of the lip, at line 3—3, and becomes narrower as it extends to the corners. This narrowing of the lips 62 causes metal to be plowed from the mid-point 80 to the ends 82 of the groove 36 of the fastener 20 to better fill the groove, see FIG. 10, arrow C. The angle of the lips with respect to vertical also facilitates the movement of the metal within the groove and plows metal from the center to the outer side of the groove, see FIG. 10, arrow D. As illustrated, the wider lip at section 3—3 leaves less room between the lip at 3—3 and the walls 38 and 42 of the fastener 20. Because there is less room, the panel metal at this location must be displaced elsewhere and the path of least resistance is to the wider areas towards the ends of the lips, i.e., sections 4—4 and sections 5—5. Therefore, the metal is plowed or pushed away from the midpoint of the lip to fill the entire groove 36.

The panel 22 includes a mating region 72 which is driven into mating contact with grooves 36 by lips 62. The mating region 72 includes a panel bottom 74, first side surface 76 and second side surface 78. As illustrated, the panel 22 in the mating region 72 is forced under the inwardly extending sidewalls 38 and 42, in other words, the grooves 36 are filled with the mating region 72.

The cross-sections in FIGS. 3 through 5 are taken along the corresponding lines in FIG. 2 to illustrate the increasing width of the first side surface 76 as its distance increases from the general midpoint 80 of groove 36, to the opposed ends 82 of groove 36. In the preferred embodiment, a flat surface 79 is provided for facilitating tooling and dimensioning of the die button. Other than the flat surface 79, the sidewall 62 is angled.

In use, the fastener is fed into an installation head, such as for example, the installation head disclosed in U.S. Pat. No. 5,487,215. The installation head is mounted to the platen of a press with the die member mounted to the opposite platen. Sheet metal 22 is mounted upon the die member and the press closes, driving a fastener from the installation head into the panel and the die member. The lips 60 and 62 are driven into the grooves 36 and adjacent end walls 30 deforming metal into the grooves 36 and along side the end walls 30. A slug is pierced from the panel by the end face 28 of the pilot and the pilot 26 is received through the pierced panel opening.

The stress on typical die member lips is about 600,000 to 700,000 PSI. A typical die member with forces in this range is disclosed in U.S. Pat. No. 4,630,363. In previous die members manufactured by applicant, the contact face of the clinching lips were about 0.019 inches wide resulting in the potential for broken die members because of the high forces per square inch. In the disclosed embodiment, the contact face of the clinching lips at the midpoint is wider, approximately 0.050 inches, to reduce the forces being applied. Additionally, the height of the lips 60, 62 is less to better withstand the forces and facilitate filling of the groove 36. Overall, with the angled lips, flattened end faces and height reduction, the stresses on the lips have been reduced to about 107,000 PSI which greatly extends the life of the die member. A further benefit is the reduction of the bending stresses on the clinch lips 62. By reshaping the clinch lips 62, the bending stresses are reduced by 31,600 PSI, from about 152,000 PSI to about 121,000 PSI.

It should be appreciated that the dimensions provided are approximate and are for the disclosed die button to obtain optimum performance. The die button dimensions may change as a result of the volume of the metal into which the fastener is installed and may change depending upon the width of the groove 36 in fastener 20.

FIG. 9 illustrates a cross-section of the die button 24 as the installation of the fastener to the panel completed. As illustrated, the slug 69 has been cut from the panel 22 by the pilot portion 26.

FIG. 10 is a top view of FIG. 9 illustrating the fastener 20 attached to a panel 22 on top of die member 24. The arrows C and D illustrate the flow of metal in both the lateral direction D and longitudinal direction C of the groove 36. As can be seen, the metal flows in two directions from the mid-point 80 out to the ends 82.

Applicant has found that the die button of the first embodiment is preferably used in low carbon, low strength stamping material. The second embodiment discussed below is preferably used in high strength, low alloy stamping material.

Figure 6:
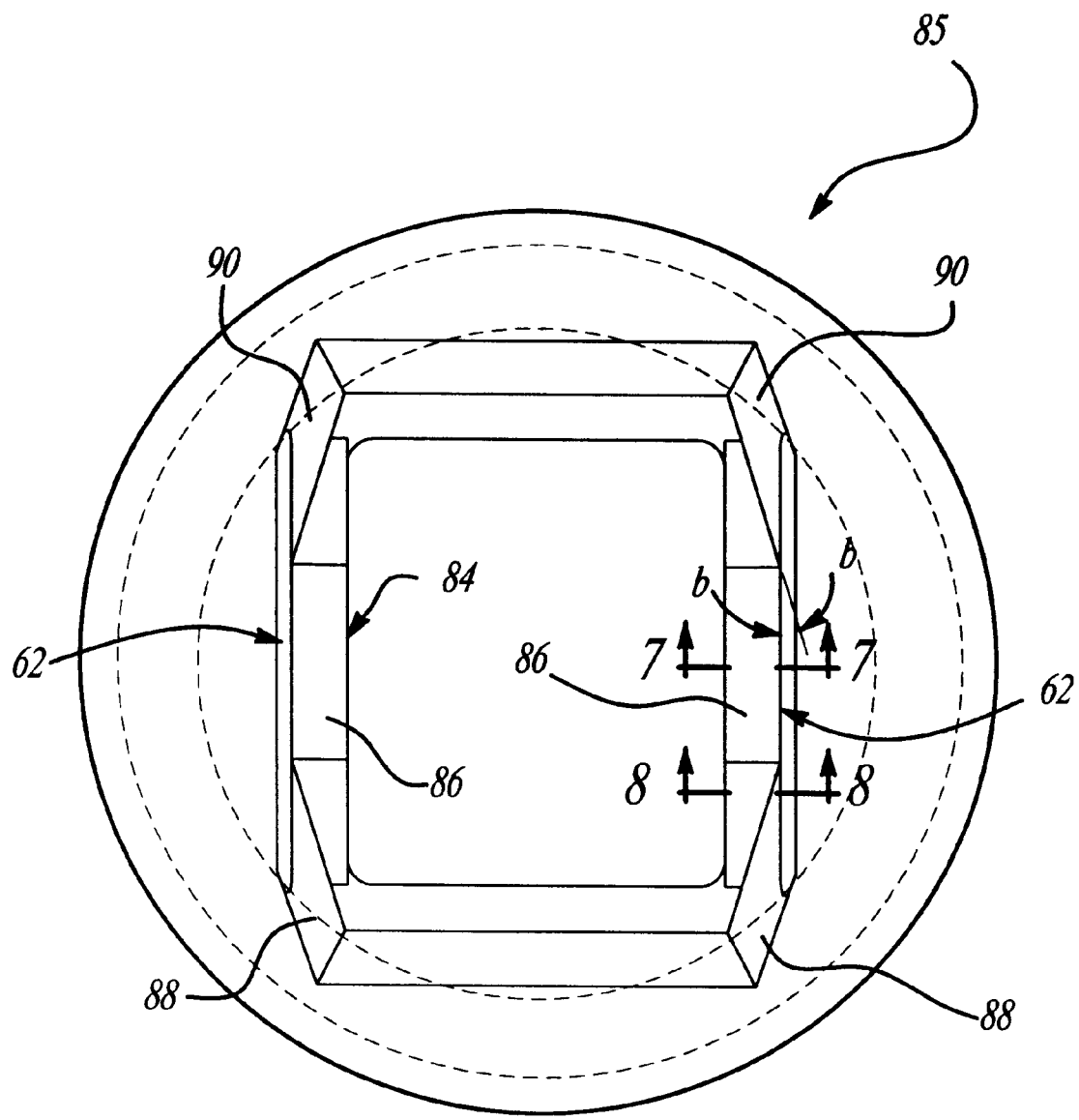
FIG. 6 is a top view of a second embodiment of the design button of the present invention.
Figure 7:
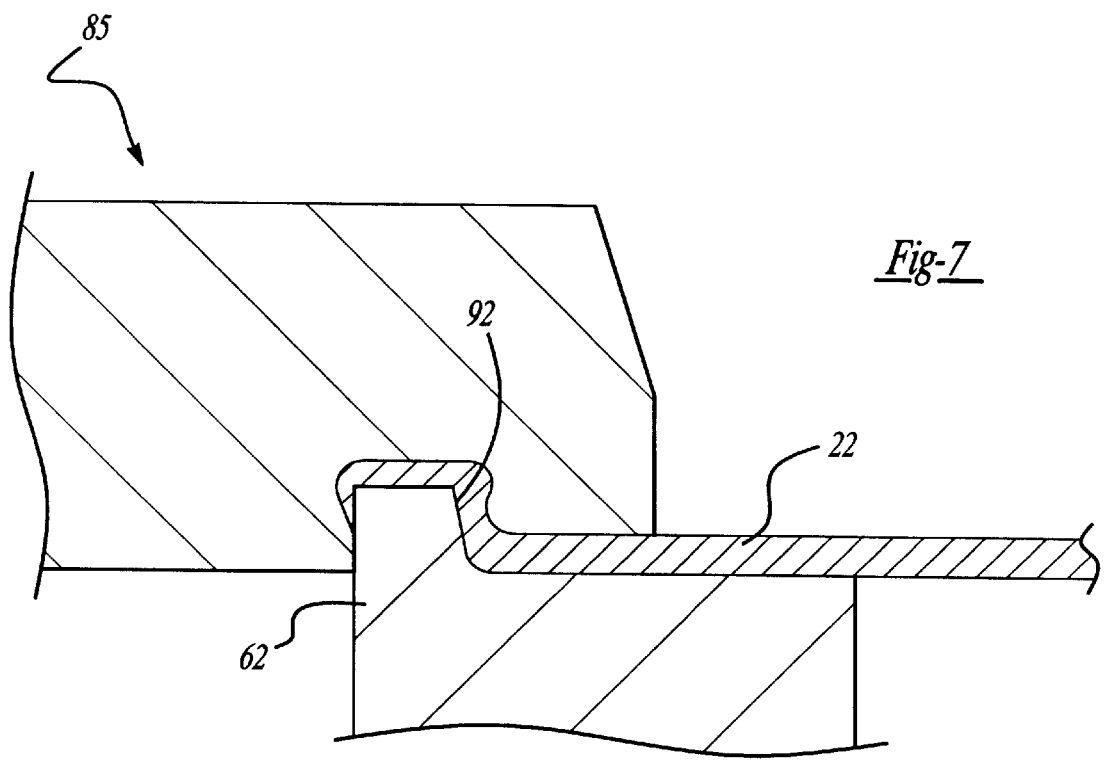
FIG. 7 is a cut-away view taken along lines 7—7 of FIG. 6.
Figure 8:
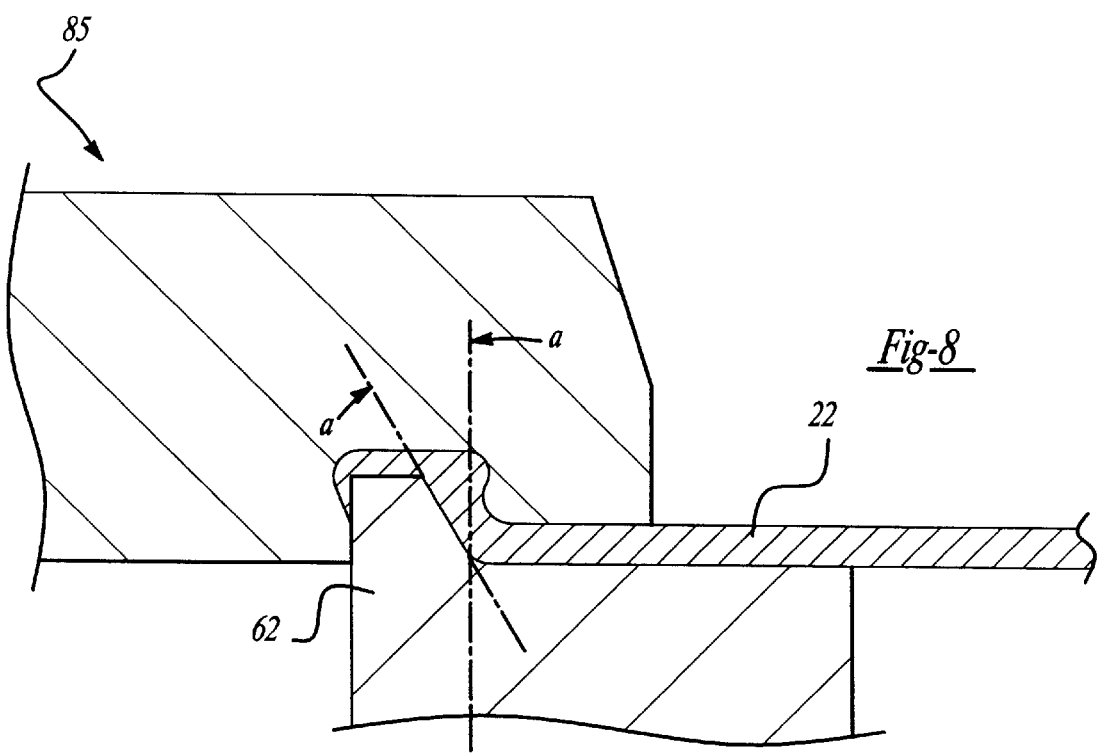
FIG. 8 is a cut-away view taken along lines 8—8 of FIG. 6.

With reference to FIGS. 6–8, a further embodiment of the die button of the present invention is illustrated at 85. In this embodiment, the clinching lips 62 are angled in the same manner as the clinching lips 62 of the previous embodiment. However, in this embodiment, the lips 62 are angled at a spaced distance from the mid-portion 84 of the lip 62. As can be seen in this embodiment, there is a wider mid-section 86 than in the previous embodiment. In the disclosed embodiment, the mid-section 86 is approximately ⅝ inches in length. The length of the mid-section 86 will vary depending upon the fastener size that is used. The width of the contact face 61 in this embodiment is approximately 0.059 inches. As with the previous embodiment, the dimensions may change depending upon the volume of the metal and the size of the groove 36. In this embodiment, the die button 85 has inclined surfaces 88 and 90 which plow metal in the same manner as the previous embodiment, but because of the wider and longer mid-section 86, less metal is plowed. It has been found that with a thicker section on the lips 62, there is lower stresses in the fastener. With greater amounts of metal being plowed, the fastener might be deflected to accommodate the metal being moved, which is not acceptable in many applications.

In the preferred embodiment, a break-away angle 92 is provided. The break-away angle 92 is provided to avoid sticking of the lip 62 in the panel. By providing the break-away angle of about 7° along the mid-section 86, the lips 62 can freely release from the panel after the panel has been driven into the grooves 36.

The invention has been described in an illustrative manner, and it is to be understood that the terminology which has been used is intended to be in the nature of words of description rather than limitation.

Obviously, many modifications and variations of the present invention are possible in light of the above teachings. It is, therefore, to be understood that within the scope of the appended claims, the invention may be practiced otherwise than as is specifically described.

What is claimed is:

1. A die member comprising:
   a body having an end face;
   a pair of opposed clinching lips protruding from said end face, said clinching lips being generally parallel to one another;
   said clinching lips having a generally flat end surface for engaging a panel to which a fastener is to be installed, a base which is integral to said end face and an outer sidewall, said sidewall joining said end surface and said base, each of said clinching lips having a mid-point and opposed ends with said clinching lips being wider at said mid-point than at said opposed ends, and said base being wider than said end surface.

2. The die member of claim 1 wherein said clinching lips narrow gradually from about said mid-point to said opposed ends.

3. The die member of claim 1 wherein said clinching lips begin to narrow gradually a spaced distance on either side of said mid-point.

4. The die member of claim 1 further including an opening extending through said body and said end face.

5. The die member of claim 4 further including inner sidewalls spaced from said outer sidewall, said inner sidewalls positioned about said opening.

6. The die member of claim 1 further including a pair of opposed staking lips protruding from said end face, said staking lips being generally parallel to one another and generally perpendicular to said clinching lips.

7. The die member of claim 6 wherein said staking and clinching lips are joined to form a continuous protrusion.

\* \* \* \* \*